(12) United States Patent
Gottin et al.

(10) Patent No.: US 12,309,665 B2
(45) Date of Patent: May 20, 2025

(54) EDGE-ENABLED TRAJECTORY MAP GENERATION

(71) Applicant: Dell Products L.P., Round Rock, TX (US)

(72) Inventors: Vinicius Gottin, Rio de Janeiro (BR); Pablo Nascimento Da Silva, Niterói (BR); Paulo Abelha Ferreira, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 649 days.

(21) Appl. No.: 17/585,055

(22) Filed: Jan. 26, 2022

(65) Prior Publication Data

US 2023/0239658 A1    Jul. 27, 2023

(51) Int. Cl.
*H04W 4/029* (2018.01)
*G06F 18/213* (2023.01)
*H04W 4/02* (2018.01)

(52) U.S. Cl.
CPC .......... *H04W 4/029* (2018.02); *G06F 18/213* (2023.01); *H04W 4/027* (2013.01); *G06F 2218/22* (2023.01)

(58) Field of Classification Search
CPC ....... H04W 4/029; H04W 4/027; H04W 4/35; H04W 4/40; H04W 4/38; H04W 4/02; H04W 4/021; H04W 4/024; H04W 64/00; H04W 4/80; H04W 4/025; H04W 64/006; H04W 4/33; H04W 40/20; H04W 24/02; H04W 4/026; H04W 88/02; H04W 24/08; H04W 64/003; H04W 12/63; H04W 28/0226; H04W 4/30; H04W 72/51; H04W 72/542; H04W 16/20; H04W 52/0251; H04W 40/18; H04W 60/04; G06F 18/213; G06F 2218/22; G06F 18/23; G06F 16/29; G06F 17/18; G06F 16/9024; G06F 16/24; G06F 16/906; G06F 18/24147; G06F 18/24133; G06F 16/2246; G06F 11/3058; G06F 16/316; B66F 9/0755; B66F 17/003
See application file for complete search history.

(56) References Cited

U.S. PATENT DOCUMENTS

| | | | |
|---|---|---|---|
| 2012/0143504 A1* | 6/2012 | Kalai | H04L 67/025 701/533 |
| 2013/0260791 A1* | 10/2013 | Malinovskiy | H04W 4/024 455/456.1 |
| 2017/0030723 A1* | 2/2017 | Ding | G06F 16/29 |
| 2024/0053167 A1* | 2/2024 | Karavas | G06N 3/08 |

OTHER PUBLICATIONS

Wu et al., A Novel Method of Missing Road Generation in City Blocks Based on Big Mobile Navigation Trajectory Data, ISPRS Int. J. Geo-Inf. 2019, 8(3), 142, published Mar. 14, 2019 (Year: 2019).*

* cited by examiner

*Primary Examiner* — Alison Slater
*Assistant Examiner* — Jing Gao
(74) *Attorney, Agent, or Firm* — Krishnendu Gupta; Deepika Bhayana; Derek Lam

(57) ABSTRACT

Techniques for edge-enabled trajectory map generation are disclosed herein. For example, a method can include segmenting one or more node trajectories based on data collected at a node, determining one or more initial trajectories based on the segmented node trajectories, and generating a map including trajectories generated by associating attribute data and event data with the initial trajectories.

20 Claims, 14 Drawing Sheets

EDGE-ENABLED TRAJECTORY MAP GENERATION

FIELD

Embodiments of the present invention generally relate to node trajectory generation. More specifically, at least some embodiments relate to systems, hardware, software, computer-readable media, and methods for generating trajectories for node objects in an edge environment to facilitate logistics operations.

BACKGROUND

Logistics in environments, such as warehouse environments, can be difficult to monitor and manage at least because many different objects may exist and/or operate simultaneously. Many objects in an environment are mobile in nature while other objects may be stationary or fixed. As a result, care should be exercised with regard to the other objects in the environment to help ensure that accidents or other problems do not occur. This can be difficult as many of the objects may operate concurrently and their positions may not be known.

In a warehouse environment, for example, multiple mobile devices may be operating at the same time. Examples of these mobile devices includes forklifts. The forklift operators need to look out for each other in addition to taking care around other objects or hazards such as shelving or storage space, pillars, docks, pallets, and the like. Even if these forklift operators are able to communicate with each other, it is difficult to coordinate the movement of multiple forklifts and ensure that undesirable interactions do not occur. Effectively performing logistics operations to ensure safety around hazards in an environment is complex and involves many unknowns in environments such as warehouse environments.

SUMMARY

In one embodiment, a method comprises segmenting one or more node trajectories based on data collected at a node; determining one or more initial trajectories based on the segmented node trajectories; and generating a map including trajectories generated by associating attribute data and event data with the initial trajectories.

In some embodiments, the one or more initial trajectories can be determined based on one or more subtrajectories and frequencies that are identified based on the segmented node trajectories. In addition, the determining the one or more initial trajectories can further comprise determining two or more centerline nodes and a center line for the initial trajectory using a ring-step clustering algorithm to process the one or more subtrajectories. In addition, the data can comprise sensor data collected at the node, and the node trajectories can be segmented based on the sensor data. In addition, the data can comprise position data collected at the node, and the one or more node trajectories can be segmented based on a temporal gap, a spatial gap, or a spatial stop identified based on the position data. In addition, the spatial gap can be identified based on the temporal gap. In addition, the method can further comprise deploying the generated map to the node. In addition, the map can be configured to allow for spatial indexing. In addition, the map can comprise a quadtree data structure. In addition, the method can further comprise processing a query using the map to determine a subsequent trajectory for the node based on position data for the node and on the attribute data and event data associated with the initial trajectories. In addition, the method can further comprise processing a decision-making action based on the subsequent trajectory. In addition, the processing the decision-making action can further comprise causing the subsequent trajectory, the position data, the attribute data, or the event data to be provided as input to machine-learned models or to rule-based engine determinations.

Other example embodiments include, without limitation, apparatus, systems, methods, and computer program products comprising processor-readable storage media.

Other aspects of the invention will be apparent from the following description and the appended claims.

BRIEF DESCRIPTION OF THE DRAWINGS

The foregoing summary, as well as the following detailed description of exemplary embodiments, will be better understood when read in conjunction with the appended drawings. For purposes of illustrating the invention, the drawings illustrate embodiments that are presently preferred. It will be appreciated, however, that the invention is not limited to the precise arrangements and instrumentalities shown.

In the drawings.

DETAILED DESCRIPTION

Figure 1:
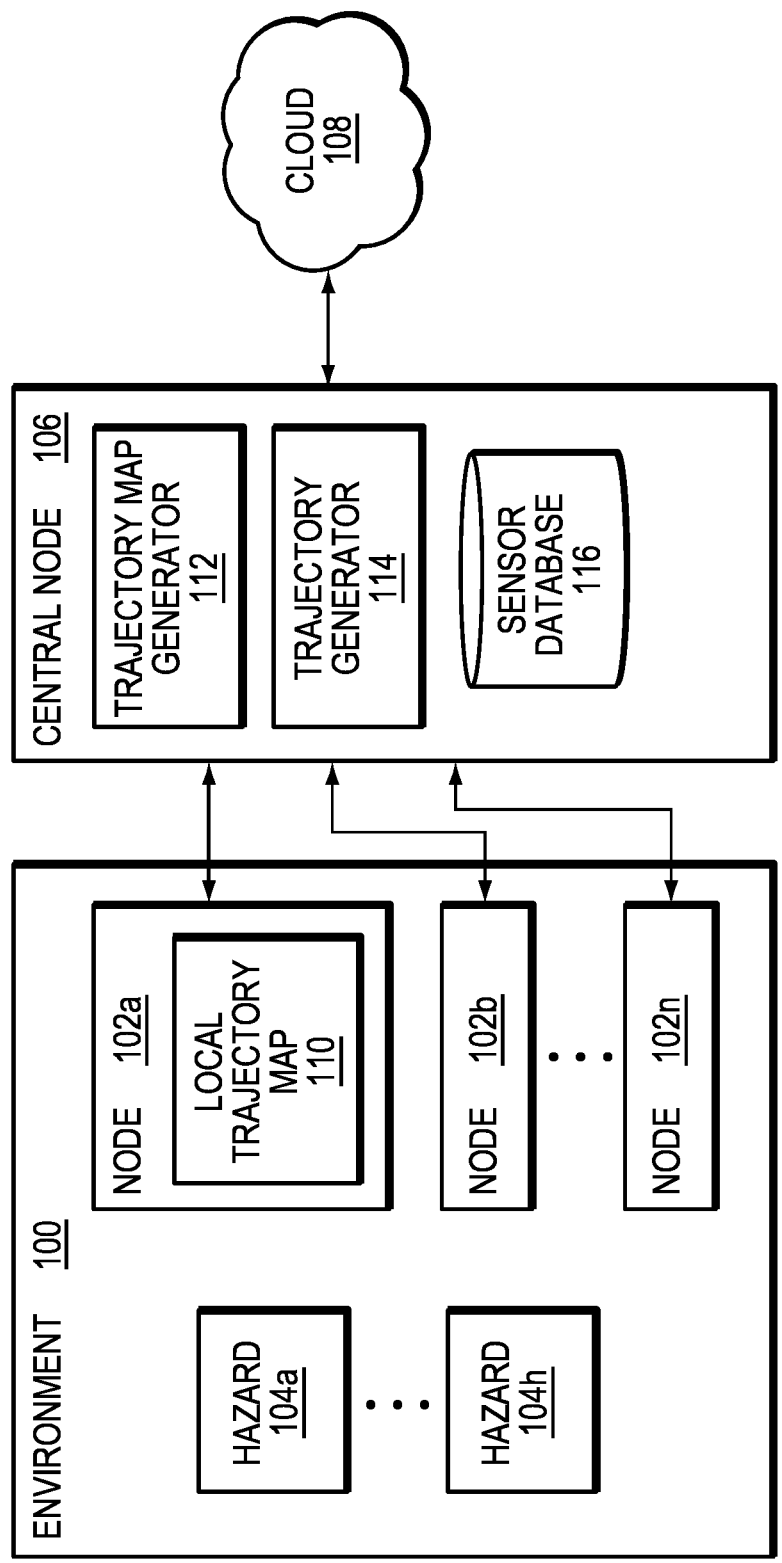
FIG. 1 illustrates aspects of a logistics system configured to be implemented in an environment or domain in accordance with example embodiments.

Embodiments of the present invention generally relate to node trajectory generation. More specifically, at least some embodiments relate to systems, hardware, software, computer-readable media, and methods for generating trajectories for node objects in an edge environment to facilitate logistics operations.

Disclosed herein are filtering, mining, and clustering techniques to compose a map of trajectories for nodes (e.g., mobile entities) at the near edge. Advantageously, the map is configured to associate domain attributes with initial trajectories' waypoints.

In a domain or environment associated with an edge infrastructure, such as determining forklift trucks' trajectories within a warehouse, technical problems arise in connection with gathering and structuring multiple nodes' data so as to enable decision making while minimizing response delay. More specifically, example technical problems include the following:

Composing typical trajectories in a structured manner;
Enabling decision-making tasks in a distributed environment; and
Minimizing delay for decision-making at the edge A further technical problem includes supporting decision-making tasks in edge environments comprising multiple dynamic entities. One such example involves forklifts as edge nodes operating in warehouse environments. Example problems associated with this use case include the following:

Reasoning about typical trajectories at the edge; and
Enabling rich real-time decision-making tasks in a distributed environment Regarding reasoning about typical trajectories at the edge, leveraging past experiences of multiple edge nodes (e.g., forklifts) for real-time or near-real-time decision making can be challenging. Conventional machine learning models can be trained for specific tasks, if the data from multiple nodes can be aggregated into a central node for the training itself. However, no single conventional general model for decision-making tasks can be deployed (e.g., due to model size and complexity). Furthermore, only certain parts of past experiences may be relevant for a given decision-making task at hand.

Regarding rich real-time decision-making, forklifts as edge nodes in the environment may operate in many distinct operational modes. For example, a forklift unloading and loading cargo from a dock is expected to behave differently than one traversing the warehouse elsewhere. Training a conventional machine learning model for each possible operational mode is prohibitive, both regarding training as well as the deployment of the models for inference. The edge nodes may have a limited processing capacity and may be unable to store and run an unlimited number of models in real time.

A still further technical problem is that in conventional deployments not only machine learning models may be used for decision making, but also rule-based engines. These rules may require richer levels of information than the raw sensor data, but the processing may take significant time and impact the possibility of providing real-time assessment. One approach may be to devise these rules to use the inference of machine learning models, but then the same restrictions apply as discussed above.

Example embodiments provide technical solutions to the technical problems articulated above. Example embodiments are configured to process data collected at the near edge, for example from sensors deployed on each mobile entity, without requiring specific external sensors and without requiring communication between entities. Disclosed herein is a filtering, mining, and clustering process to compose a map of the trajectories at the near edge, associating domain attributes with initial trajectories' waypoints. Furthermore, if event data is available, the map can be used to correlate areas of the domain or environment (e.g., indoor space) with event frequencies.

Specific embodiments of the invention will now be described in detail with reference to the accompanying figures. In the following detailed description of example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-14, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

Throughout this application, elements of figures may be labeled as "a" to "n" (or to another letter, such as "h"). As used herein, the aforementioned labeling means that the element may include any number of items and does not require that the element include the same number of elements as any other item labeled as "a" to "n." For example, a data structure may include a first element labeled as "a" and a second element labeled as "n.". This labeling convention means that the data structure may include any number of the elements. A second data structure, also labeled as "a" to "n," may also include any number of elements. The number of elements of the first data structure and the number of elements of the second data structure may be the same or different.

FIG. 1 shows aspects of an environment in which at least some example embodiments of the invention may be deployed or implemented. FIG. 1 illustrates a logistics system including nodes 102a, 102b, . . . , 102n and a central node 106. The nodes and the central node are configured to coordinate performance of logistics operations.

In example embodiments, the environment 100 is a warehouse or other environment. The nodes 102a, 102b, . . . , 102n (sometimes collectively referred to herein as the nodes 102 or a node 102) operate or exist in the environment. In the context of a warehouse environment, the nodes may have different types and correspond to or be associated with objects related to the warehouse environment. In the present example, the nodes may correspond to or be associated with forklifts. Alternatively, the nodes may correspond to or be associated with other objects (e.g., machinery, hazards, persons, corridors, corners, shelving) that may be mobile, movable, or stationary and which are hazards from the perspective of the forklifts.

In example embodiments each node 102 may be associated with or include sensors. The array of sensors may depend on the associated object. The nodes may also include compute resources such as a processor, memory, networking hardware, or the like.

For example, the node 102a, which may be attached to or be an integral part of an object such as forklift, may be configured with sensors of various types and with sufficient hardware (e.g., processor, memory) to use and query a local trajectory map 110. Other forklifts in the environment may also include or be associated with a local trajectory map.

For example, if the node 102a corresponds to or is associated with a forklift, the sensors of the node may be arranged on the forklift in different manners. For example, position sensors may be deployed on the forklift's arms (forks or tines). By placing sensors on the arms, the positions of the arms relative to the forklift body and in the environment 100 can be determined. In one example, the position sensors of the node 102a generate positional data that determine a position of the forklift. The sensors of the node accordingly allow a center position of the node to be determined. Positional data can also be collected as time series data, which can be analyzed to determine a position of the forklift, a velocity of the forklift, a trajectory, a direction of travel, or the like.

In example embodiments, the hazards 104a, . . . , 104h (sometimes referred to herein as the hazards 104 or a hazard 104) occupy the environment 100. The hazards represent relevant aspects of the operational area, which may include movable and/or static objects. In one example, a defined area may also constitute a hazard.

In example embodiments, the central node 106 includes a trajectory map generator 112, a trajectory generator 114, and a sensor database 116. The central node (e.g., implemented in a near edge infrastructure) is configured to communicate with each node 102. The communication may be performed through hardware such as a router, gateway, or other devices. Depending on the sensors and configuration of the node, the communication may be one way. For example, a pallet associated with an RFID (radio frequency identification) tag may simply be read to determine the pallet's position. In contrast, a forklift may also receive information from the central node and use the information to perform logistics operations.

In example embodiments, a trajectory map generator 112 at the central node 106 generates a map of the environment. The map may be stored at the central node and/or at the edge nodes 102. The present logistics system is configured to map position data received from the nodes into the map of the environment. This allows the positions of all nodes (objects) to be determined with respect to each other and with respect to the environment 100. The trajectory map generator is configured to compose a trajectory map structure based on positioning data and additional sensor data.

In example embodiments, a trajectory generator 114 at the central node 106 is configured to receive collected inertial measurement unit data (e.g., inertial measurements of acceleration and deceleration) and positioning data from a set of entities (e.g., forklifts). Trajectories from each entity are mined and generated from a repository, segmented by spatial and temporal sequentiality. Similar subtrajectories (e.g., from multiple entities) are filtered with respect to similarity in positioning. The present system may use domain knowledge (e.g., of points of interest) to further filter the subtrajectories of interest.

Each such subtrajectory is assigned domain-dependent attributes, which may relate to other entities (e.g. driving profiles associated with each trajectory), to events (e.g. the relative frequency of an event such as dangerous cornering in a trajectory cluster), and to areas of interest (e.g. the trajectory cluster crosses a known hazard area). The resulting trajectories and associated attributes are added to a data structure (a map) that allows querying and inspection in real-time.

The map can be used to assess the current trajectory of a node or other entity against historical information, allowing for informed planning, warning and autonomous control actions. For example, if a forklift's current trajectory resembles a typical trajectory that leads to a dangerous cornering (e.g., the current trajectory or the typical trajectory contain a point in the map that is related to a high frequency of dangerous cornering events), the present system can be configured to raise an alarm and/or decrease the thresholds for accelerometer data collection.

The sensor database 116 is configured to store sensor data received from the nodes 102 and other nodes in the environment 100. Because the nodes are associated with or integrated with objects, the sensor database corresponds to information about the objects. More specifically, the sensor database may be used to store the position information generated by forklifts.

The sensor database 116 in the present embodiment is implemented using one or more storage systems associated with the present logistics system. Such storage systems can comprise any of a variety of different types of storage including network-attached storage (NAS), storage area networks (SANs), direct-attached storage (DAS) and distributed DAS, as well as combinations of these and other storage types, including software-defined storage.

It is to be understood that the particular set of elements shown in FIG. 1 for edge-enabled trajectory map generation techniques involving the nodes 102 and the central node 106 of the present logistics system is presented by way of illustrative example only, and in other embodiments additional or alternative elements may be used. Thus, another embodiment includes additional or alternative systems, devices, and other network entities, as well as different arrangements of modules and other components. For example, in at least one embodiment, the central node 106 and the sensor database 116 can be on and/or part of distinct processing platforms.

It is to be appreciated that this particular arrangement of modules 112, 114, 116 illustrated in the central node 106 of the FIG. 1 embodiment is presented by way of example only, and alternative arrangements can be used in other embodiments. For example, the functionality associated with modules 112, 114, 116 in other embodiments can be combined into a single module, or separated across a larger number of modules. As another example, multiple distinct processors and/or memory elements can be used to implement different ones of modules 112, 114, 116 or portions thereof. At least portions of modules 112, 114, 116 may be implemented at least in part in the form of software that is stored in memory and executed by a processor.

Figure 2:
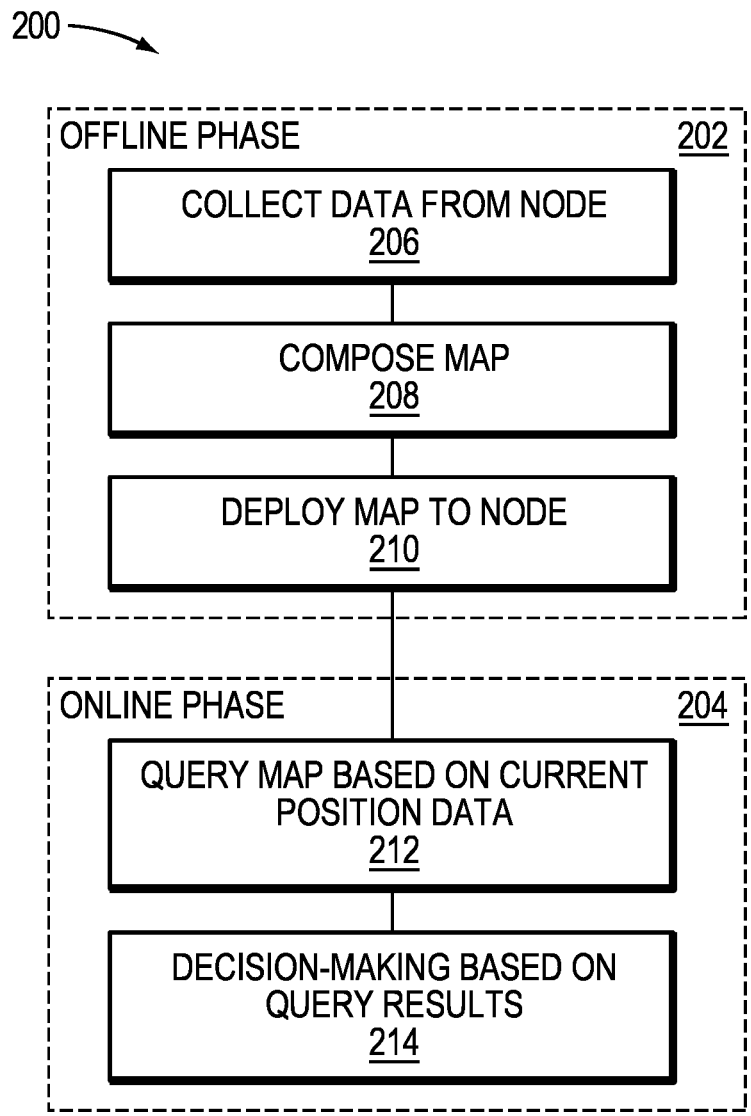
FIG. 2 illustrates aspects of a method for generating and using a map in accordance with example embodiments.

FIG. 2 shows aspects of a method for generating and using a map in accordance with example embodiments. The method 200 includes an offline phase 202 and an online phase 204.

In example embodiments, the offline phase 202 includes a data collection stage (step 206), in which data is gathered from sensors deployed at forklifts. A map composition stage (step 208) includes determining node trajectories from the collected data that includes associated attributes and events, if available. The map composition stage also includes determining initial trajectories (sometimes referred to herein as typical trajectories) from shared subtrajectories and/or trajectories of interest. The map is then deployed to the nodes (e.g., forklifts) (step 210).

Although the map composition and deployment have been described in connection with an offline approach for purposes of illustration, in example embodiments the sensor data can also be collected in an online phase, e.g., collected at a central node for continuous or substantially continuous updating of the map structure.

In example embodiments, the online phase 204 represents processing in substantially real-time when the forklift is operating. With the map deployed to the forklift, a querying process (step 212) determines which, if any, of the initial trajectories correspond to the forklift's current positioning data (e.g., via a spatial indexing query). The attributes of those initial trajectories can be potentially used for decision making (step 214) (e.g., by informing a machine-learned model or a rule-based engine).

Figure 3:
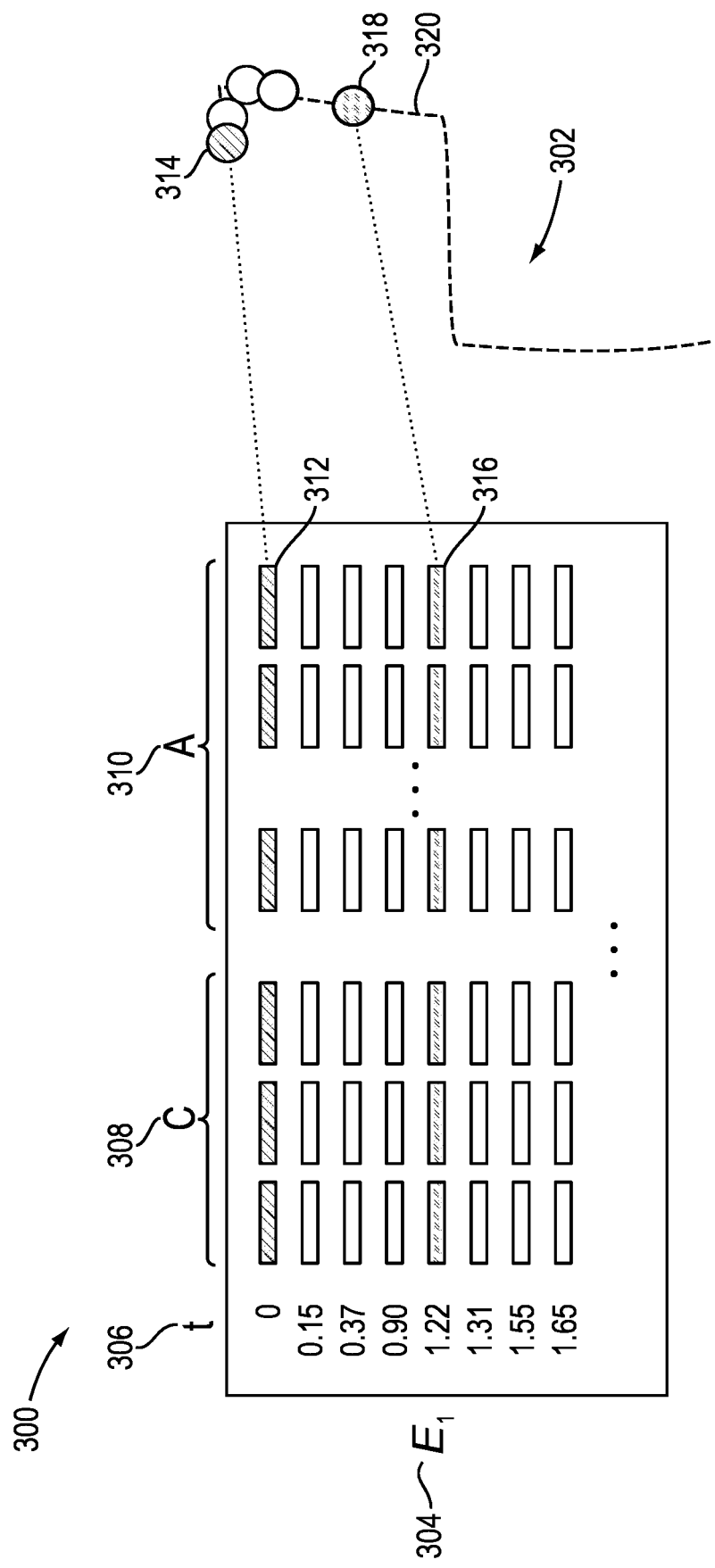
FIG. 3 illustrates aspects of generating a node trajectory in accordance with example embodiments.

FIG. 3 shows aspects of generating a node trajectory in accordance with example embodiments. At least some example embodiments use trajectory data 300 to generate a node trajectory 302 for an entity 304.

In example embodiments, the entity 304 can be a node. Each entity is associated with a sequence of collections of data. In some example embodiments, the data can be sensor data collected at and received by the node.

In example embodiments, the data includes position data c 308 and attribute data A 310 associated with time data t 306. More specifically, the sensor data may include one or more collections (t, c, A) that each include the position data c and additional attributes A collected at time instant t. The example values represented for the timestamps are illustrative only, and may differ depending on the domain and environment. In example embodiments, a data collection can be aggregated, at the node or at the central node, based on sensor data received from the sensors deployed at the forklifts. The present system is then configured to correlate collections of sensor data events associated with sets of sensors and nodes among the nodes. A collection may be triggered periodically, or by a change in values (e.g., one collection every time an acceleration or deceleration is observed based on the data), or a combination.

In example embodiments, if the granularity of the data is undesirably high, then the data may be filtered, for example using a minimum time delta. FIG. 3 illustrates two collections 312, 316 as a representative resulting set of collections, for example if a rule of a minimum of 1 second between collections is applied. That is, the collection 316 at t=1.22 seconds is used and the intervening collections are filtered out (e.g., at t=0.15, 0.37, and 0.90 seconds). This heuristic may be adjusted as appropriate for the domain or environment.

In example embodiments, the position data 308 is determined using an available distance function $D(c_1, c_2)$. For example, given positional data from two collections a distance function is configured to yield a distance as a result. Depending on the nature of the positional data this function may vary. For example, for two-dimensional coordinates (as may be found in connection with the floor of a warehouse), the function D may correspond to a Euclidean distance between the coordinates. For GPS coordinates of latitude and longitude, geospatial computation may apply, especially if the domain spans large distances, such as greater than a few kilometers or miles. For ease of illustration, the present disclosure uses two-dimensional x-y coordinates and Euclidean distance. However, higher or lower dimensions and appropriate distance measures may be used as appropriate for the relevant domain or environment.

In example embodiments, since the attribute data 310 may originate from different sensors (both among themselves and in relation to positioning sensors), the attribute data may be collected with a slight delay relative to one another. Accordingly, the present system can be configured to correlate readings from multiple sensors into a single collection, with t being a representative time instant. Typically, t may be the earliest time associated to the readings comprising a collection. FIG. 3 illustrates the timestamp 306 of the collections for the entity 304 as a delta from the initial collection (e.g., at t=0), in seconds.

In example embodiments, the attribute data 310 may be reflected in a set of attributes $A=\{a_1, a_2, \ldots, a_n\}$ that is known beforehand. Not all attributes may have values for all collections. That is, some collections may have missing values for some attributes without detrimentally impacting the present system. In example embodiments, there may be a unique attribute type that relates to the indication of events. The present system is configured to distinguish attributes from events, as attributes typically result from a reasoning process. Example attributes include, but are not limited to, bearing angle, mast position, load weight, and the like. Non-limiting example events include dangerous cornering indications, collisions, the types of alarms raised by real-time monitoring systems, and the like. Events may be determined by machine learning models, rule-based engines, or the like. As such, events are the attributes most likely to have missing values.

In example embodiments, the node trajectory 302 reflects one or more sequences of position data 308 and attribute data 310, as described in further detail below. For example, collections 312, 316 are illustrated and correspond to points 314, 318 of the example node trajectory. A path 320 can also be defined by the sequence of collections, reflecting movement of the entity 304 along the domain or environment. That is, the present system uses the sequence of collections for an entity to define the movement of that entity along the domain or environment. In example embodiments, the present system leverages the path and movement of the entity to determine trajectories and sequences of coherent position data and attribute data, as described in further detail below.

Figure 4:
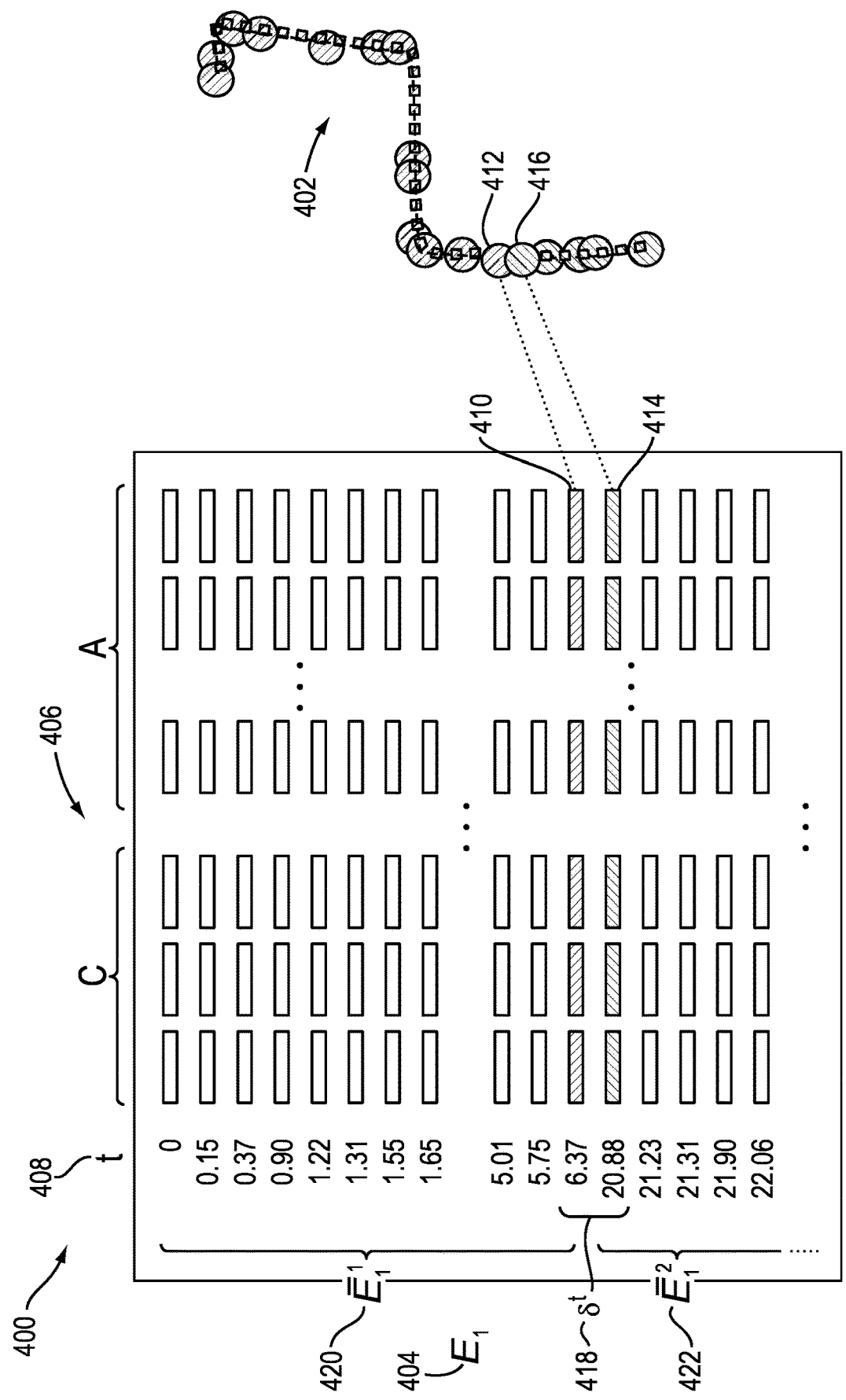
FIGS. 4-6 illustrate aspects of segmenting a node trajectory in accordance with example embodiments.

FIG. 4 shows aspects of segmenting a node trajectory in accordance with example embodiments. At least some example embodiments use trajectory data 400 to generate example trajectories 402, 424 for an entity 404.

In example embodiments, the trajectories 402, 424 are generated based on sequences of data 406 collected from a node. Example data includes, but is not limited to, sensor data such as position data (c) and attribute data (A) associated with time t 408.

In example embodiments, the present system is configured to segment the data into trajectories. The segmented trajectories assist the present system to identify common and interesting past behavior, for example based on raw sensor data. From a database of sequences of collections, the present system is configured to derive a database of trajectories. More specifically, FIG. 4 illustrates obtaining a set of trajectories 420, 422 $\{E_i^1, E_i^2, \ldots\}$ from each entity $E_i$ 404 (e.g., forklift). The set of trajectories of all entities is sometimes referred to herein as $\mathbb{E}$.

In example embodiments, the sequences of collections are segmented using two categories of criteria, temporal and spatial. The temporal criterion is described in connection with FIG. 4 and the spatial criteria are described in connection with FIGS. 5 and 6, in further detail below. The associated reasoning is based on an observation that the sequences of data collections can be interrupted for certain periods, during which the positioning data may or may not continue to be collected. Alternatively, the forklift may stay still while the data collections continue, implicating a spatial stop, as described in further detail in connection with FIG. 6.

In example embodiments, the present system is configured to segment one or more node trajectories based on a temporal gap. More specifically, the temporal aspect includes determining a temporal gap or difference $\delta^t$ 418. For the temporal aspect, the present system is configured to use a maximum time difference $\delta^t$ between two sequential collections (t, c, A) and (t', c', A') such that a difference $|t'-t|>\delta^t$ determines a break. For example, FIG. 4 illustrates an example value for $\delta^t$ of 15 seconds, and lower or higher time differences may be used as appropriate for the domain or environment. In the illustrated example scenario, it is presumed that the forklift did not collect data for longer than that predetermined period, e.g., between t=6.37 and t=20.88, thus the present system determines that a segmentation break has occurred. An appropriate value for $\delta$ may depend on the domain and may be set by a separate process or domain specialist.

Accordingly, collections 410, 414 are illustrated and correspond to point 412 of the trajectory 402 and point 418 of the trajectory 424, respectively. FIG. 4 illustrates an example segmentation of a sequence of collections for the entity $E_1$ 404 into two trajectories 420, 422. More specifically, the sequence of collections for the entity $E_1$ are segmented into two trajectories, trajectory $\overline{E}_1^{\,1}$ 420 and trajectory $\overline{E}_1^{\,2}$ 422. Collection 410 represents the final collection associated with the trajectory $\overline{E}_1^{\,1}$ and collection 414 represents the first collection associated with the trajectory $\overline{E}_1^{\,2}$.

Figure 5:
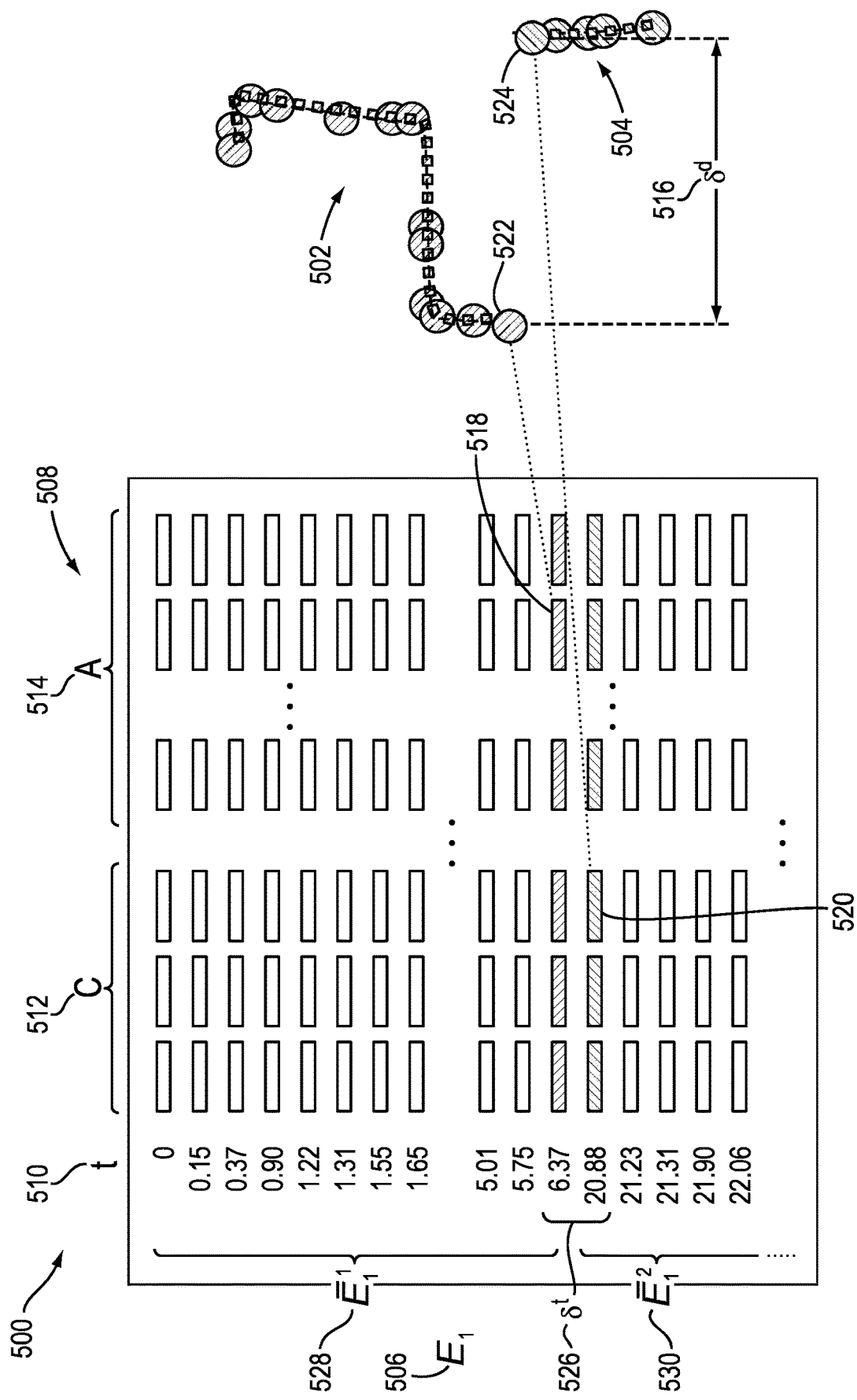

FIG. 5 shows aspects of segmenting a node trajectory in accordance with example embodiments. At least some example embodiments use trajectory data 500 to generate example trajectories 502, 504 for an entity 506.

In example embodiments, the present system uses spatial criteria determined based on data 508 to generate the example trajectories 502, 504. The spatial criteria can include, by way of example and not limitation, a spatial gap or a spatial stop. Identification of a spatial gap is illustrated in FIG. 5 and identification of a spatial stop is illustrated in FIG. 6.

In example embodiments, the present system identifies a spatial gap by detecting a change in the position data c 512 for the entity $E_1$ 506 along with a substantial difference in the associated time data t 510. The attribute data A 514 can help provide additional context or confirmation for putative spatial gaps. In a non-limiting example, example collections 518, 520 are associated with example trajectory points 522, 524. The position data c for collection 518 indicates the entity $E_1$ was at one position 522 at a first time (e.g., t=6.37 seconds) and at another position 524 at a second time (e.g., t=20.88 seconds). Accordingly, it can be inferred, for example, that this gap reflects a pause in collection of sensor data but with continued movement by the forklift.

Similarly to the maximum time difference $\delta^t$ 526, the present system is configured to use a predetermined position parameter $\delta^d$ 516. The position parameter can represent a minimum distance between two sequential collections for the collections to compose a same trajectory. In example embodiments, the value of $\delta^d$ may be defined in relation to, or as a function of, $\delta^t$.

Figure 6:
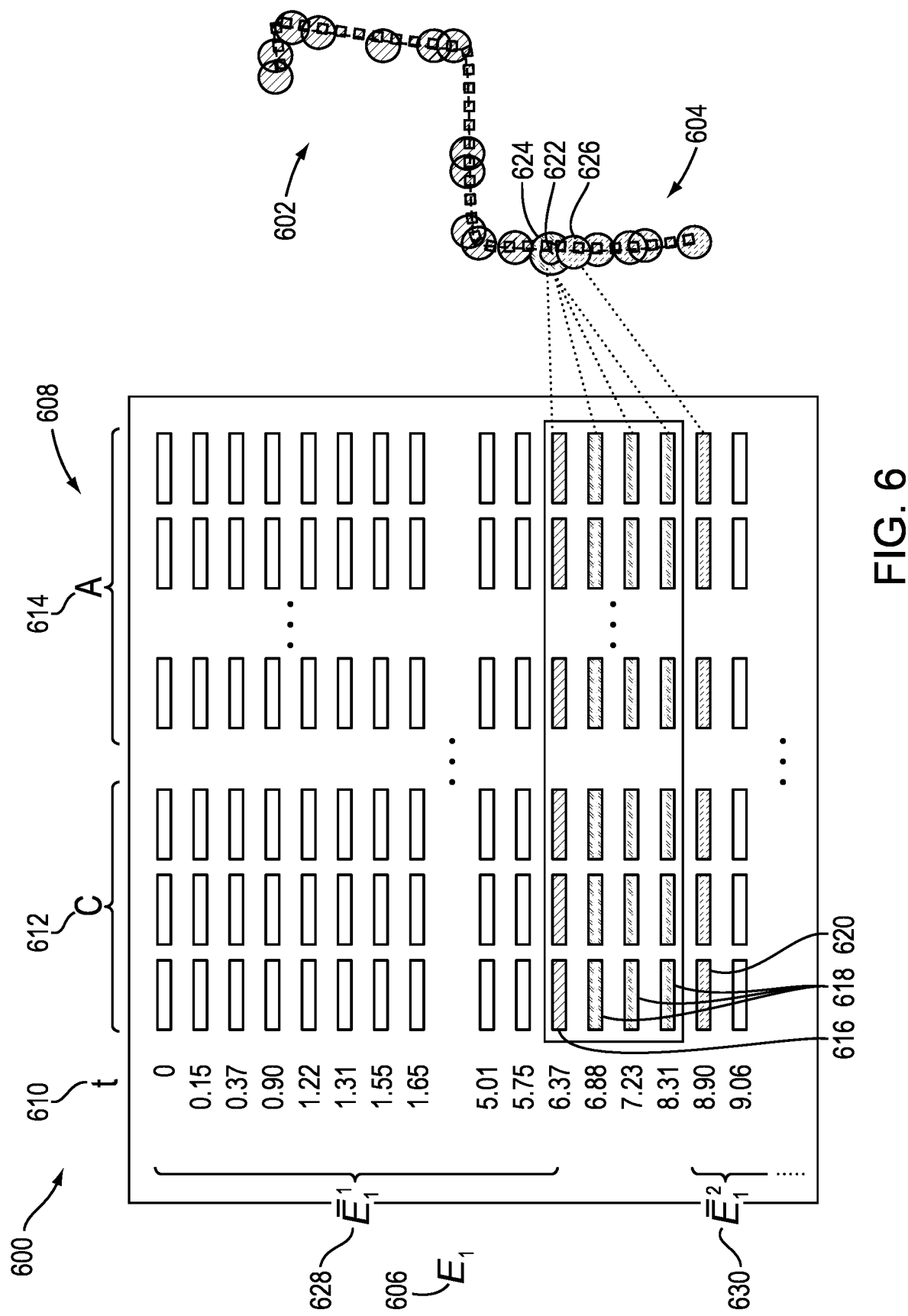

FIG. 6 shows aspects of segmenting a node trajectory in accordance with example embodiments. At least some example embodiments use trajectory data 600 to generate trajectories 602, 604 for an entity 606.

In example embodiments, a spatial stop is identified by detecting no changes in the position data over a predetermined period of time. More specifically, a spatial stop can be identified when a sequence of collections indicates no changes in positioning for a predetermined time period.

The determination of a spatial stop can be based on repeated positional data (i.e. collections (t, c, A), (t', c', A'), for t<t'. The following example criteria may apply:
1. A spatial stop can be identified based on a predetermined number of collections having repeated positional data, e.g., at least k collections having the same position data c; and/or
2. A spatial stop can be identified based on a minimum threshold of time difference between collections having repeated positional data, e.g., assuming spatial stops take at least a certain number of seconds.

In both cases, as similar for $\delta^t$ and $\delta^d$, appropriate values for the above thresholds may be predefined depending on the domain or environment.

FIG. 6 illustrates an example representation of a stop by an entity 606 $E_1$ (e.g., a forklift). The example collections 616, 618, 620 illustrated are all presumed to have the same positional data c.

In further example embodiments, the collections 618 are discarded. Identification of spatial stops also implies that a certain number of collections may be discarded and not considered as part of either trajectory 628, 630. The present system is configured to treat the first of the collections with repeated positional data as part of the first trajectory 628, e.g., collection 616 corresponding to point 622 of trajectory 602. The present system is further configured to treat the first collection after discarded collections (e.g., the next collection with distinct positional data) as part of the next trajectory 630, e.g., collection 620 corresponding to point 626 of trajectory 604.

Figure 7:
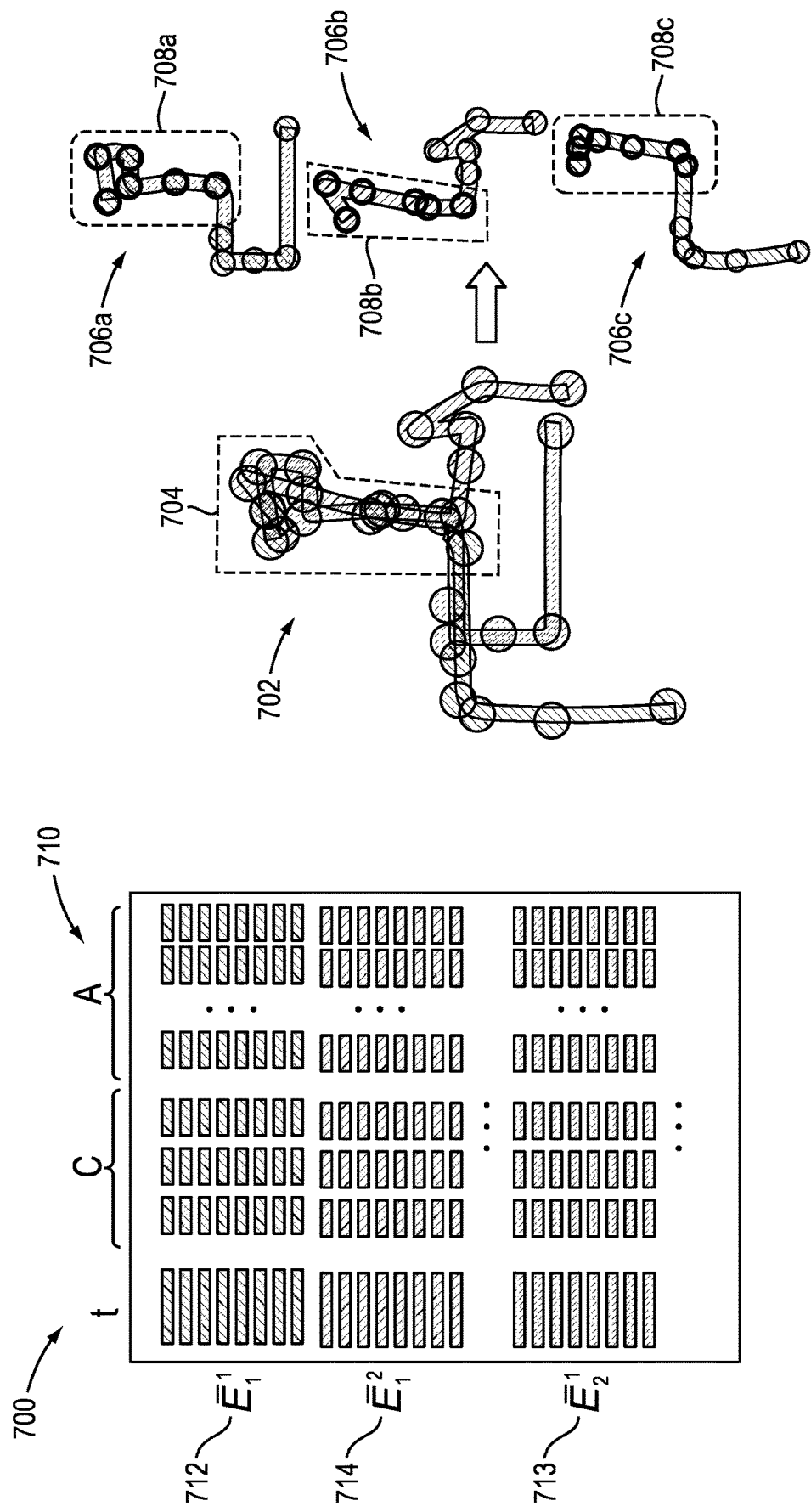
FIGS. 7-10 illustrate aspects of determining an initial trajectory in accordance with example embodiments.

FIG. 7 shows aspects of determining an initial trajectory in accordance with example embodiments. At least some example embodiments use trajectory data 700 to identify subtrajectories shared among initial trajectories 706a, 706b, 706c for one or more entities, for example entities $E_1$ and $E_2$.

More specifically, FIG. 7 illustrates an example process of determining subtrajectories in a restricted domain based on example trajectories 702. In example embodiments, an example subtrajectory 704 is determined based on a set of three trajectories 706a, 706b, 706c from two entities $E_1$, $E_2$. The collections 712, 714, 716 of the trajectories are shaded to correspond to the trajectories' representations. Collection 712 corresponds to trajectory 706c, collection 714 corresponds to trajectory 706b, and collection 716 corresponds to trajectory 706a. The trajectories are shown overlayed 702 to illustrate a subtrajectory 704 that is shared among each trajectory. Regions 708a, 708b, 708c illustrate shared points in each trajectory 706a, 706b, 706c that are determined based on the determined subtrajectory.

Continuing with the illustrated example, the trajectories $\overline{E}_1^{\,1}$, $\overline{E}_1^{\,2}$ 712, 716 both originate from a same entity $E_1$ (e.g., a forklift), while trajectory $\overline{E}_2^{\,1}$ originates from entity $E_2$ (e.g., a forklift). Regardless, the present system is configured to determine that the example trajectories share a portion, e.g., an example subtrajectory 704 having a support score of 3. The support score is described in further detail below in connection with an example algorithm for determining a subtrajectory.

With a database of trajectories $\overline{\mathbb{E}}$ from multiple entities, the present system is configured to determine subtrajectories along with relative frequencies for the subtrajectories, based on the node trajectories. The example algorithm discussed below leverages an appropriate distance function as discussed above in connection with FIG. 3. It will be appreciated that the example algorithm may be considered computationally expensive (e.g., involving relatively high time complexity or run time requirements). Accordingly, alternative algorithms can also be applied, so long as the alternative algorithms produce similar output.

The example algorithm begins with defining a set of candidate subtrajectories that is initially populated with the members of $\overline{\mathbb{E}}$. To each of those members, the present system is configured to assign an initial support score of 1. As used herein, a support score refers to a measure of similarity among candidate subtrajectories, e.g., a count of candidate subtrajectories that are similar to the subject subtrajectory. the number of original candidate subtrajectories that is similar to the subtrajectory.

Then, the example algorithm below is configured to iteratively construct and refine the set of candidate subtrajectories. At each iteration, the algorithm selects the candidate having the largest support score and compare the selected candidate to another candidate. Additional filtering and/or spatial segmentation approaches can be used to speed up this process.

The example algorithm is as follows:
1. Given a tolerance argument γ, and a pair of trajectories $\overline{E^1}, \overline{E^2} \in \overline{\mathbb{E}}$, with $|\overline{E^1}| < |\overline{E^2}|$ and support scores $s_1$ and $s_2$ from the candidate set
2. Let s be the maximum support between $s_1$ and $s_2$
3. If not $|\overline{E^2}| < r$ and not $|\overline{E^1}| << |\overline{E^2}|$:
    3.1. Downsample the positioning data in $\overline{E^1}$ and $\overline{E^2}$ by a predetermined magnitude
4. Perform an approximate search of $\overline{E^1}$ in $\overline{E^2}$ and obtain the best matching sequence $\overline{E^q}$
5. If the difference between $\overline{E^1}$ and $\overline{E^q}$ is smaller than γ
6. Add $\overline{E^q}$ to the set of candidates with a support of s+1

To mitigate potentially large computational costs of applying the algorithm above, in some embodiments the present system is configured for approximate search to determine subtrajectories, and also to allow for downsampling of positioning data when one trajectory is much larger than the other. That downsampling may help alleviate the computational costs in the cases where at least one of the trajectories is not sufficiently small to allow for the efficient subsequence search.

In the example algorithm, $|\overline{E^i}|$ refers to a length of the trajectory (in number of points). The constant r refers to a predetermined trajectory size threshold, e.g., a number of points that denotes a threshold of sufficiently small trajectories so as to avoid downsampling. The approximate search for best matching sequence may depend on the kind of positioning data and distance function available. For two-dimensional positional data and Euclidean distance conventional subsequence search approaches can be used. Some conventional search approaches yield the difference between $\overline{E^1}$ and $\overline{E^q}$ as a side product or side effect, as the approaches use the difference internally as a comparison criterion in support of best-match. In example embodiments, an approach for fast similarity search includes Mueen's Algorithm for Similarity Search, www.cs.unm.edu/~mueen/FastestSimilaritySearch.html, the entire contents of which are incorporated by reference herein for all purposes.

As previously discussed, the example algorithm can be iteratively applied to the subtrajectories with the largest support. It will be appreciated that the example algorithm leverages transitivity in similarity even though transitivity is not mathematically guaranteed by the example algorithm, since the algorithm allows for approximate search). This quality helps address positioning data that is seldom exact, for example due to noise at the sensor level.

Also as previously discussed, especially when processing a large number of trajectories, the example algorithm may be considered computationally expensive (e.g., having high time complexity). In some embodiments, the example algorithm is configured to take place at a central node in a computational environment having sufficient computational resources, e.g., in terms of processor, memory, storage, network, and the like.

In example embodiments, a relative frequency of the trajectory can also be computed with the score. Let E be the set of entities that performed a trajectory containing the subtrajectory. The present system is configured to determine the relative frequency of that subtrajectory as $$\frac{s}{|E|}.$$

The relative frequency can refer to a measure of relevancy for the subtrajectory relative to the entities that performed it. In the example of FIG. 7, all of entity $E_2$'s trajectories (e.g., the single trajectory 706a) contain the shared subtrajectory 704 (as shown in region 708a). The same is true for all of entity $E_1$'s trajectories (e.g., the trajectories 706b, 706c as shown in the regions 708b, 708c). Hence, the present system is configured to consider the example subtrajectory 704 highly representative of the behavior of those forklifts $E_1$, $E_2$. The present system is configured to assign a relative frequency score of 1 to that subtrajectory 704 in this illustrated example.

In alternative example embodiments, consider a separate example situation in which, besides the illustrated trajectories, the present system has also identified trajectories $\overline{E_1}^3$ and $\overline{E_1}^4$ along with $\overline{E_2}^2, \overline{E_2}^3,$ and $\overline{E_2}^4$, where the additionally identified trajectories do not contain the illustrated subtrajectory 704. In this case, only 1 in 4 of $E_2$'s trajectories would contain the subtrajectory and only 2 in 4 of $E_1$'s trajectories. Accordingly, the present system is configured to assign a lower relative frequency score to that subtrajectory.

Figure 8:
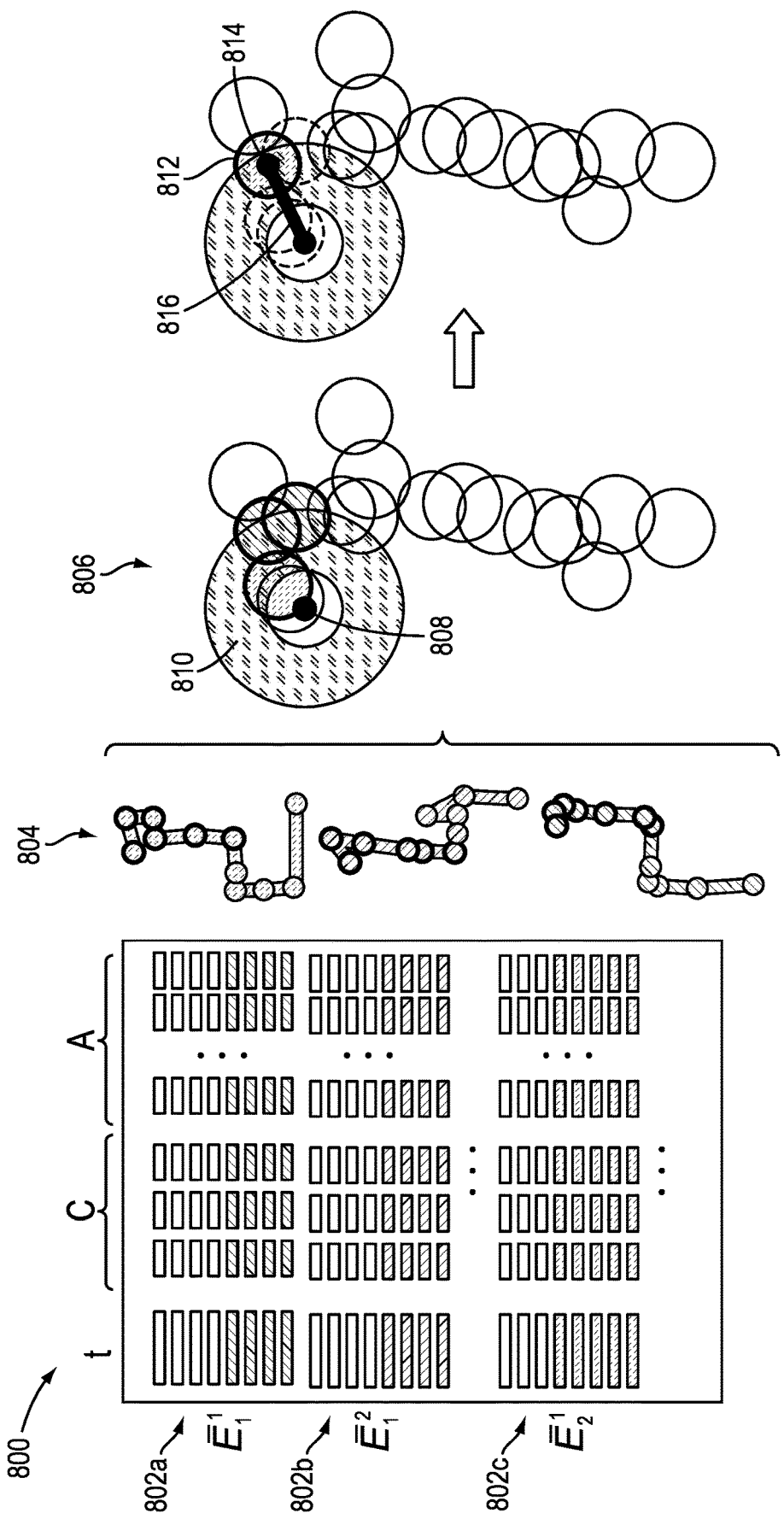

FIG. 8 shows aspects of determining an initial trajectory in accordance with example embodiments. At least some example embodiments use trajectory data 800 to determine an initial trajectory based on the subtrajectories 804.

FIG. 8 illustrates example results from a first iteration of a process of determining an initial trajectory 806. In example embodiments, the initial trajectory includes a centerline 816 that is determined based on central node points 808, 812.

The collections 802a, 802b, 802c represent collections of the trajectories 804 belonging to a subtrajectory. The positioning and timestamp data (t, c) of those collections determines an ordered set 806 of points. FIG. 8 illustrates the points as circles for purposes of illustration, where the points are at the center of each circle. A starting point is selected to be a first centerline node 808. FIG. 8 also illustrates the ring 810 determined by a minimum and maximum distance. The result of a first iteration of a process for determining an initial trajectory is illustrated, including selecting a second node 812. In example embodiments, the approach includes a ring-step clustering algorithm that is described in further detail below.

In example embodiments, an initial trajectory is determined based on the subtrajectories and associated relative frequencies. For example, the process begins with selecting all candidate subtrajectories having a relative frequency above a predetermined threshold k (or, optionally, all subtrajectories having a support score above a predetermined threshold) and performing an algorithm to determine a most typical path for that trajectory. Advantageously, the example algorithm described below is able to reduce the (potentially large and overlapping) number of points comprising the original trajectories that determine the shared subtrajectory, obtaining a centerline of that sub-trajectory, such as example centerline 816. The centerline is determined by central node points, such as example central node points 808, 814.

Accordingly, several kinds of algorithms can be applied. In example embodiments, the present system is configured to apply a ring-step clustering algorithm as follows. Techniques for applying a ring-step clustering algorithm can also be found at H. Wu, Z. Xu, and G. Wu, "A Novel Method of Missing Road Generation in City Blocks Based on Big Mobile Navigation Trajectory Data," *ISPRS Int. J. Geo-Inf.* (2019), the entire contents of which are incorporated by reference herein for all purposes.

The present system is configured to select a first point from the original points in the subtrajectory as a starting point. The starting point can preferably be one of the points at the start of the subtrajectory. For example, the starting point should correspond to the positioning data of the first shared collection of any of the trajectories that comprise the subtrajectory.

In example embodiments a ring-step clustering process can be iteratively applied to determine a sequence of centerline nodes 808, 814. This process takes into account the following:

a minimum and maximum distance from a current node to select the next node (e.g., node 812); and a computation of the density of each point falling inside a ring area 810 defined by those distances the point with maximum density (e.g., point 814) is chosen as the next node 812.

Figure 9:
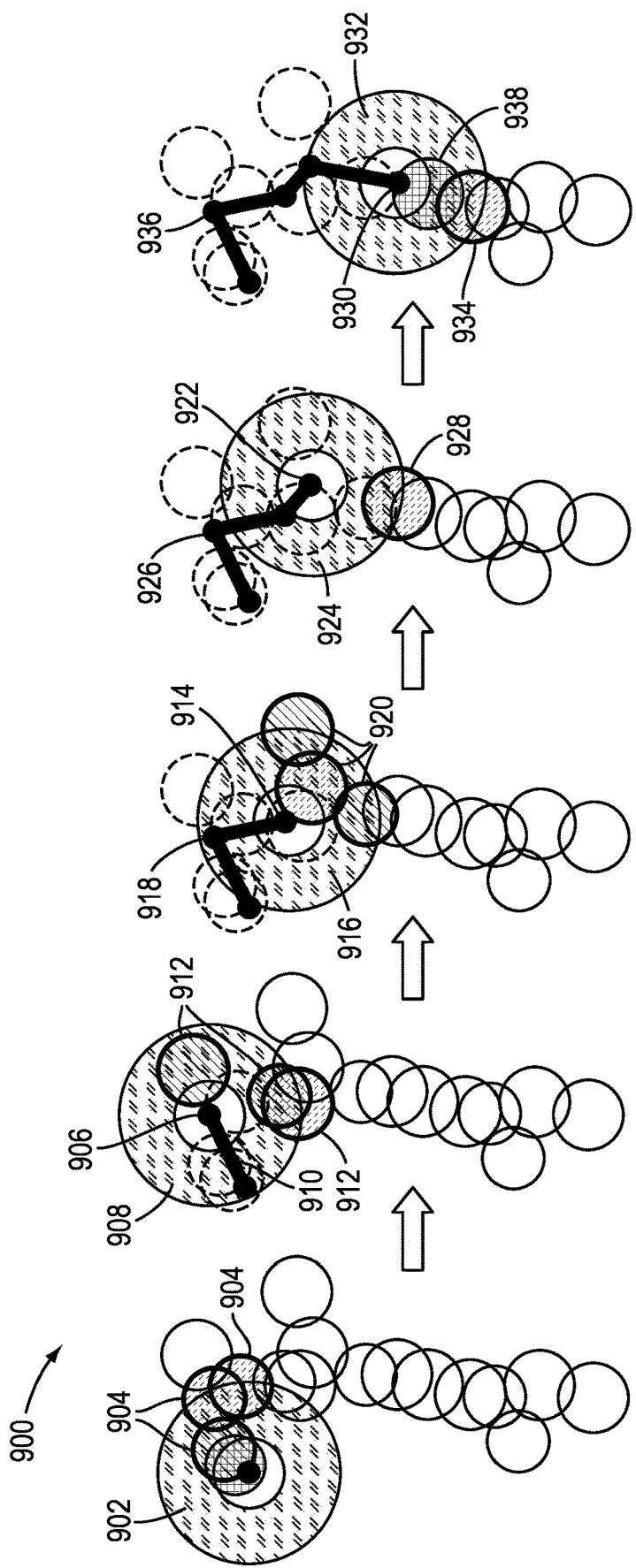

FIG. 9 shows aspects of determining an initial trajectory in accordance with example embodiments. At least some example embodiments use trajectory data 900 to determine an initial trajectory based on subtrajectories and frequency data. FIG. 8 illustrates example iterations of node selection via an example ring-step algorithm.

An initial trajectory may include one or more central nodes such as example central nodes 906, 914, 922, 930. The initial trajectory may also include a centerline such as example centerline 910, 918, 926, 936.

FIG. 9 illustrates example iterations of the example ring-step algorithm. Circles 904, 912, 920, 928, 934 represent points within the ring 902, 908, 906, 924, 932 determined by a predetermined minimum and maximum distance of the most recently selected node 906, 914, 922, 930. Darkened circle 938 represent points below the minimum distance. Both are not considered for the following iterations and are from then on illustrated with a dashed line.

The example ring-step clustering algorithm iteratively selects the next node 904, 912, 920, 928, 934 in a similar fashion as described above in connection with FIG. 8. Previously considered points are not considered for the next iteration. Points that were close (e.g., below the minimum distance) in a previous iteration are likewise discarded for the following iterations.

Figure 10:
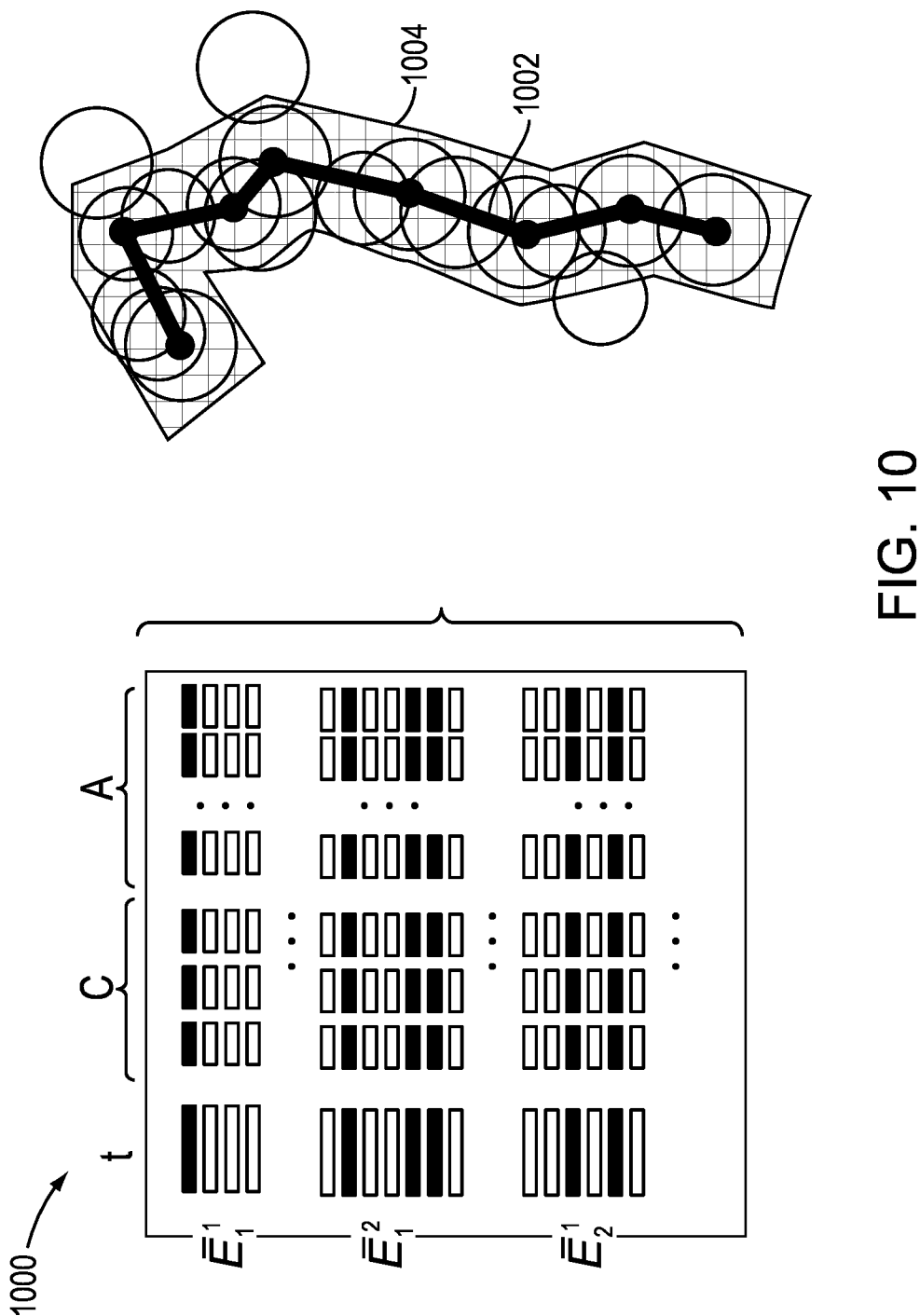

FIG. 10 shows aspects of determining an initial trajectory in accordance with example embodiments.

In example embodiments, an initial trajectory 1000 includes a set 1002 of centerline nodes and an associated area 1004 of tolerance. The centerline nodes 1002 are determined based on collections of sensor data received at each node, as described above. Accordingly, each centerline node can be related back to a collection in the original trajectory data. FIG. 10 illustrates example collections in red, where each example collection relates to an illustrated centerline node. Collections from the original node trajectory that do not belong to the subtrajectory are omitted for purposes of illustration.

The set of centerline nodes can be used to determine an area of tolerance around each centerline node, such as the example area of tolerance 1004. In example embodiments, the present system is configured to use the area of tolerance for determining whether a point from a collection's positioning data is part of the initial trajectory. One example algorithm, similar to the ring-step algorithm described above in connection with FIGS. 8 and 9, is to determine a segmented joint path, connecting and centered around the centerline nodes, with a width determined in relation to the radius of the ring-step algorithm.

Figure 11:
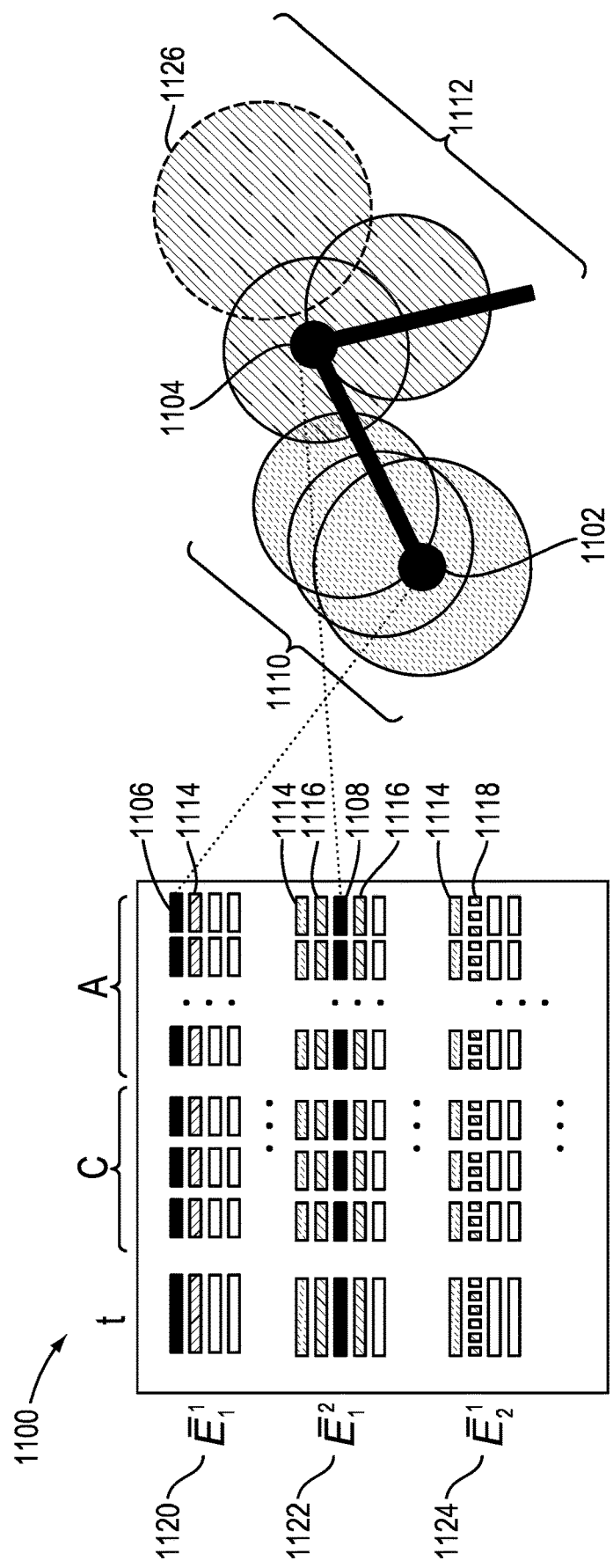
FIG. 11 illustrates aspects of updating the initial trajectories in accordance with example embodiments.

FIG. 11 shows aspects of updating the initial trajectories in accordance with example embodiments. FIG. 11 illustrates an example approach for associating collections in the original data to the closest node in the initial trajectory.

For each initial trajectory, the present system is configured to generate trajectories by associating attribute data and event data with the initial trajectories (e.g., by aggregating statistics of attributes of interest with the initial trajectories). The following is an example procedure.

For each collection in the original data that falls within the area of tolerance of the initial trajectory, the present system is configured to identify the trajectory node closest to the collection (e.g., based on position data). Points outside the initial trajectory tolerance area may be optionally discarded. An example collection is illustrated in FIG. 11.

As shown in FIG. 11, the present system is able to associate sets of collections to the nodes of the initial trajectory. Advantageously, the centernodes 1102, 1104 of the initial trajectory themselves correspond directly to one collection each (e.g., collections 1106, 1108), therefore there will always be at least one collection able to be provided to an appropriate aggregation function. Also advantageously, the present system does not enforce nor require any relationship between the entities ($E_1$, $E_2$ in the example illustrated in FIG. 11) and the nodes. That is, the present system is operable under an assumption that the points associated to a node come from distinct entities or trajectories. The present system also does not require at least one point from each entity or trajectory. At this stage, all collections related to the initial trajectory are processed independently of the collection sequence of origin.

With this association, the present system is configured to apply one or more aggregation functions based on the attribute data (e.g., over each attribute or sets of attributes of interest).

As an example, assume that one attribute $\alpha_1$ in the collections is a speed measurement from velocimeter sensors. One aggregation function defined could be to determine the average speed of all the points related to a node. The same attribute $\alpha_1$ could be considered by other aggregation functions, either in isolation or in combination with other attributes. For example, both the average and top speed among the set of collections can be recorded and associated to the node.

Such example aggregations that rely purely on attribute data received directly from the sensor data collections (e.g., based on "raw" sensor data) are identified as attributes of the nodes of the initial trajectory. The definition and selection of appropriate aggregation functions will depend on the domain or environment.

In example embodiments, besides attributes, the present system is also configured to associate event frequencies to the center nodes. Unlike the attributes that can be derived directly from sensor data, the present system is also configured to leverage rich data produced by models and/or rule-based engines in the domain or environment.

As an example, assume that a sequence of speed values for a forklift, plus the weight load in the corresponding time instants, is used to determine whether an alarm is raised. This determination can be done using, for example, a rule-based reasoning approach. The rule may be arbitrarily complex and consider not only attributes of the collections, but also external data (e.g., the presence of other forklifts in the warehouse in the same day). The resulting Boolean alarm (or absence of alarm) is collected and recorded as an attribute $\alpha_z$ in the collections. In example embodiments, the present system is configured to leverage these kinds of rich attribute data (referred to herein as events), if available, to associate information to the initial trajectory nodes, in a similar manner as described above for the attributes. One typical approach would be to associate event frequencies to the nodes. In this example, that association would comprise the count of the number of collections having the attribute $\alpha_z$ (e.g., the alarm) equal to 1.

As for the attributes, the definition and selection of appropriate event frequency aggregation functions is domain dependent and can be selected accordingly. The resulting generated trajectory including aggregate attribute data and event frequencies associated with the nodes, is sometimes referred to herein as a rich trajectory. The generated trajectory is recorded into a data structure with spatial indexing for real-time querying, such as a map, as discussed in further detail below.

In example embodiments, a map composition stage can include recording the generated trajectories to a data structure that is queryable in real time. To that end, any data structure that allows for spatial indexing may apply. In one example embodiment, a quadtree structure may be used for spatial indexing of the node points. The nodes within that tree, may record the trajectory attributes (and events, if applicable) related to that node, as described above.

The map may comprise, for example, a quadtree structure used for spatial indexing of the points along with an index table that relates points to trajectory attributes. In this embodiment, a few example additional attributes of the node may be assigned as follows:

a pointer to a previous node in the same initial trajectory, and a pointer to a next node in the same initial trajectory, and the area of tolerance around that node.

Advantageously, the pointer to the next node allows traversing of the trajectories, once one is selected, as, for example, a linked list.

In example embodiments, the area of tolerance around the node may comprise a single value representing a maximum distance to the node, e.g., a radius around the point. Alternatively, more complex data structures can be appended to the node, representing more fine-grained regions. For example, an area 1004 of influence can be a custom polygon (FIG. 10), as determined by an example application of trajectory discovery as discussed above.

Other kinds of spatial indexing structures can be used, and other kinds of attributes can be additionally assigned to each node in accordance with example embodiments.

In example embodiments, the trajectory map structure is copied to the edge node. At an example edge node, such as a forklift, the storage capabilities are expected to be sufficient to enable such deployment.

In other example embodiments, if necessary and applicable, selective compression or segmentation algorithms may be applied. For example, the map structure can be segmented into parts, and all parts compressed before being deployed to the forklifts. Each forklift can then be configured to decompress only the part of the map related to its current positioning. This may leverage a dynamic mechanism to preemptively decompress appropriate parts of the map related to adjacent areas of the forklift's current position, based on position data. Techniques for determining dynamic level-of-detail of large structures that can be segmented into discrete parts, such as approaches used in simulation or game environments, can also be used in example embodiments to enable deployment of the map to the forklifts in constrained scenarios.

The map structure can be deployed to an operating forklift that is able to leverage the same raw sensor data used in the map composition at the edge, with minimal delay. The positioning data of each collection of sensor data can be used to query the map for one or more initial trajectory nodes. If the map structure provides information on the area of tolerance for a node (as discussed above, e.g., in connection with FIG. 10), that information may be used to filter out nodes outside that area.

In example embodiments, the sequence of most recent positionings can also be used to assess whether the forklift is currently traversing an initial trajectory. In example embodiments, a forklift may query the map structure periodically to determine a likelihood of being currently traversing that trajectory.

The attributes (and events) of those likely trajectories can be used to guide decision-making actions or tasks. For example, if forklifts' current positioning c (and previous positions) indicate a high likelihood of belonging to an initial trajectory A, and c is closest to a node m of A, the map structure can enable a traversal to extract the attributes of the next nodes (e.g., those nodes following m in A). That information may be used either as input to machine learned models deployed at the node, or provided to rule-based engine determinations.

Figure 12:
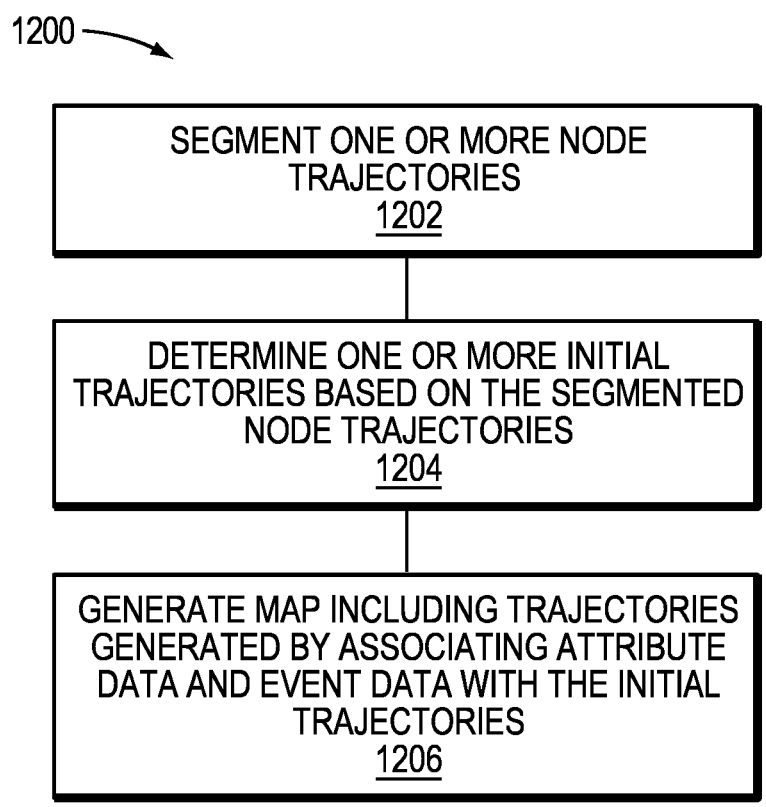
FIG. 12 illustrates aspects of a method for generating a map in accordance with example embodiments.

FIG. 12 shows aspects of a method for generating a map in accordance with example embodiments.

In example embodiments, the method 1200 includes segmenting one or more node trajectories based on data collected at a node (step 1202). The data can include sensor data collected at the node. For example, the sensor data can include position data and attribute data. The node trajectories can be segmented based on the sensor data. For example, segmenting the node trajectories can include using temporal gaps, spatial gaps, and spatial stops identified based on the position data.

In example embodiments, the method 1200 includes determining one or more initial trajectories based on the segmented node trajectories (step 1204). Determining the initial trajectories can include using subtrajectories identified based on the segmented node trajectories. Determining the initial trajectories can also include using frequencies identified based on the segmented node trajectories.

In example embodiments, the method 1200 includes generating a map including trajectories generated by associating attribute data and event data with the initial trajectories (step 1206). The map can include a quadtree data structure.

In example embodiments, the method 1200 can include transmitting the generated map to the node.

Figure 13:
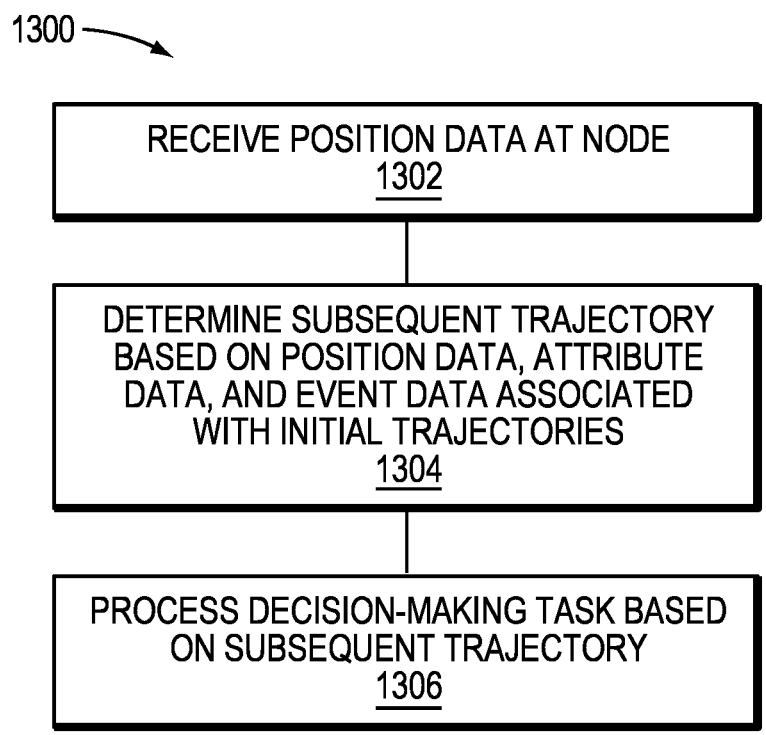
FIG. 13 illustrates aspects of a method for querying a map in accordance with example embodiments.

FIG. 13 shows aspects of a method for querying a map in accordance with example embodiments.

In example embodiments, the method 1300 includes receiving position data at a node (step 1302).

In example embodiments, the method 1300 includes determining a subsequent trajectory based on the position data, and on attribute data and event data associated with one or more initial trajectories (step 1304).

In example embodiments, the method 1300 includes processing a decision-making action based on the subsequent trajectory (step 1306). For example, the decision-making action can include providing current or previous position data in connection with the subsequent trajectory as input to machine learned models deployed at the node. The decision-making action can also include providing current or previous position data in connection with the subsequent trajectory as input to rule-based engine determinations at the node.

While the various steps in the example methods 1200, 1300 have been presented and described sequentially, one of ordinary skill in the art, having the benefit of this disclosure, will appreciate that some or all of the steps may be executed in different orders, that some or all of the steps may be combined or omitted, and/or that some or all of the steps may be executed in parallel.

It is noted with respect to the example methods 1200, 1300 of FIGS. 12 and 13 that any of the disclosed processes, operations, methods, and/or any portion of any of these, may be performed in response to, as a result of, and/or based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

As mentioned previously, at least portions of the information extraction system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIG. 14. Although described in the context of system 100, these platforms may also be used to implement at least portions of other information processing systems in other embodiments.

Figure 14:
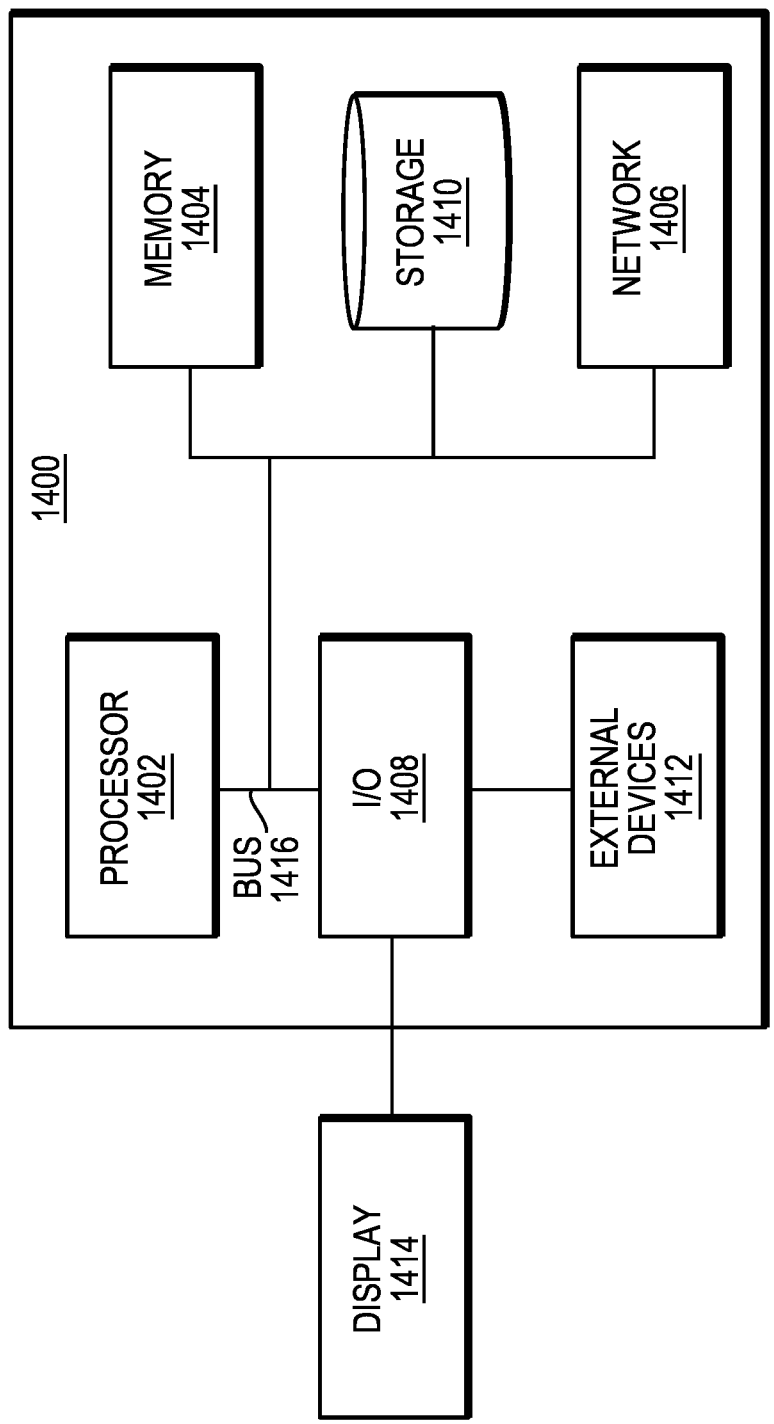
FIG. 14 illustrates aspects of a computing device or a computing system in accordance with example embodiments.

FIG. 14 shows aspects of a computing device or a computing system in accordance with example embodiments. The computer 1400 is shown in the form of a general-purpose computing device. Components of the computer may include, but are not limited to, one or more processors or processing units 1402, a memory 1404, a network interface 1406, and a bus 1416 that communicatively couples various system components including the system memory and the network interface to the processor.

The bus 1416 represents one or more of any of several types of bus structures, including a memory bus or memory controller, a peripheral bus, an accelerated graphics port, and a processor or local bus using any of a variety of bus architectures. By way of non-limiting example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1400 typically includes a variety of computer-readable media. Such media may be any available media that is accessible by the computer system, and such media includes both volatile and non-volatile media, removable and non-removable media.

The memory 1404 may include computer system readable media in the form of volatile memory, such as random-access memory (RAM) and/or cache memory. The computer system may further include other removable/non-removable, volatile/non-volatile computer system storage media. By way of example only, the storage system 1410 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 1416 by one or more data media interfaces. As has been depicted and described above in connection with FIGS. 1-13, the memory may include at least one computer program product having a set (e.g., at least one) of program modules that are configured to carry out the functions of the embodiments as described herein.

The computer 1400 may also include a program/utility, having a set (at least one) of program modules, which may be stored in the memory 1404 by way of non-limiting example, as well as an operating system, one or more application programs, other program modules, and program data. Each of the operating system, one or more application programs, other program modules, and program data or some combination thereof, may include an implementation of a networking environment. The program modules generally carry out the functions and/or methodologies of the embodiments as described herein.

The computer 1400 may also communicate with one or more external devices 1412 such as a keyboard, a pointing device, a display 1414, etc.; one or more devices that enable a user to interact with the computer system; and/or any devices (e.g., network card, modem, etc.) that enable the computer system to communicate with one or more other computing devices. Such communication may occur via the Input/Output (I/O) interfaces 1408. Still yet, the computer system may communicate with one or more networks such as a local area network (LAN), a general wide area network (WAN), and/or a public network (e.g., the Internet) via the network adapter 1406. As depicted, the network adapter communicates with the other components of the computer system via the bus 1416. It should be understood that although not shown, other hardware and/or software components could be used in conjunction with the computer system. Non-limiting examples include microcode, device drivers, redundant processing units, external disk drive arrays, Redundant Array of Independent Disk (RAID) systems, tape drives, data archival storage systems, etc.

It is noted that embodiments of the invention, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

While the invention has been described with respect to a limited number of embodiments, those of ordinary skill in the art, having the benefit of this disclosure, will appreciate that other embodiments can be devised that do not depart from the scope of the invention as disclosed herein. Accordingly, the scope of the invention should be limited only by the appended claims.

What is claimed is:

1. A method comprising:
    using sensor data and position data collected at a node to segment one or more node trajectories;
    using the position data to identify subtrajectories and frequencies for the node trajectories;
    using the identified subtrajectories and frequencies to filter the segmented node trajectories;
    determining one or more initial trajectories based on the filtered node trajectories; and
    generating a map including trajectories generated by associating attribute data and event data with the initial trajectories.

2. The method of claim 1, wherein the one or more initial trajectories are determined based on the one or more subtrajectories and frequencies that are identified to filter the segmented node trajectories.

3. The method of claim 2, wherein the determining the one or more initial trajectories further comprises determining two or more centerline nodes and a center line for the initial trajectory using a ring-step clustering algorithm to process the one or more subtrajectories.

4. The method of claim 1,
    wherein the node trajectories are segmented based on the sensor data.

5. The method of claim 1,
    wherein the one or more node trajectories are segmented based on a temporal gap, a spatial gap, or a spatial stop identified based on the position data.

6. The method of claim 5, wherein the spatial gap is identified based on the temporal gap.

7. The method of claim 1, further comprising deploying the generated map to the node.

8. The method of claim 1, wherein the map is configured to allow for spatial indexing.

9. The method of claim 1, wherein the map comprises a quadtree data structure.

10. The method of claim 1, further comprising processing a query using the map to determine a subsequent trajectory for the node based on position data for the node and on the attribute data and event data associated with the initial trajectories.

11. The method of claim 10, further comprising processing a decision-making action based on the subsequent trajectory.

12. The method of claim 11, wherein the processing the decision-making action further comprises causing the subsequent trajectory, the position data, the attribute data, or the event data to be provided as input to machine-learned models or to rule-based engine determinations.

13. An apparatus comprising:
    at least one processing device including a processor coupled to a memory;
    the at least one processing device being configured to implement the following steps:
        using sensor data and position data collected at a node to segment one or more node trajectories;

using the position data to identify subtrajectories and frequencies for the node trajectories;

using the identified subtrajectories and frequencies to filter the segmented node trajectories;

determining one or more initial trajectories based on the filtered segmented node trajectories; and generating a map including trajectories generated by associating attribute data and event data with the initial trajectories.

14. The apparatus of claim 13, wherein the one or more initial trajectories are determined based on the one or more subtrajectories and frequencies that are identified to filter the segmented node trajectories.

15. The apparatus of claim 14, wherein the determining the one or more initial trajectories further comprises determining two or more centerline nodes and a center line for the initial trajectory using a ring-step clustering algorithm to process the one or more subtrajectories.

16. The apparatus of claim 13,
wherein the node trajectories are segmented based on the sensor data.

17. The apparatus of claim 16,
wherein the one or more node trajectories are segmented based on a temporal gap, a spatial gap, or a spatial stop identified based on the position data.

18. A non-transitory processor-readable storage medium having stored therein program code of one or more software programs, wherein the program code when executed by at least one processing device causes the at least one processing device to perform the following steps:

using sensor data and position data collected at a node to segment one or more node trajectories;

using the position data to identify subtrajectories and frequencies for the node trajectories;

using the identified subtrajectories and frequencies to filter the segmented node trajectories;

determining one or more initial trajectories based on the filtered node trajectories; and generating a map including trajectories generated by associating attribute data and event data with the initial trajectories.

19. The processor-readable storage medium of claim 18, wherein the one or more initial trajectories are determined based on the one or more subtrajectories and frequencies that are identified to filter the segmented node trajectories.

20. The processor-readable storage medium of claim 18, wherein the program code further causes the at least one processing device to process a query using the map to determine a subsequent trajectory for the node based on position data for the node and on the attribute data and event data associated with the initial trajectories.

* * * * *